US012030636B2

(12) United States Patent
Annakov et al.

(10) Patent No.: US 12,030,636 B2
(45) Date of Patent: Jul. 9, 2024

(54) SECURE ENCLOSURE FOR AN ELECTRONIC INFORMATION, ENTERTAINMENT, AND TRANSACTION SYSTEM

(71) Applicant: LIFE IN THE AIR, INC., Bellevue, WA (US)

(72) Inventors: Bayram Annakov, Seattle, WA (US); Sergey Pronin, Miusinsk (RU); Timur Abdukerimov, Krasnogorsk (RU); Alla Ermicheva, Mytishchi (RU)

(73) Assignee: LIFE IN THE AIR, INC., Bellevue, WA (US)

( * ) Notice: Subject to any disclaimer, the term of this patent is extended or adjusted under 35 U.S.C. 154(b) by 0 days.

(21) Appl. No.: 17/215,464

(22) Filed: Mar. 29, 2021

(65) Prior Publication Data

US 2021/0300561 A1    Sep. 30, 2021

Related U.S. Application Data

(60) Provisional application No. 63/000,727, filed on Mar. 27, 2020.

(51) Int. Cl.
*B64D 11/00*     (2006.01)
*B33Y 80/00*     (2015.01)
*G06Q 20/12*     (2012.01)

(52) U.S. Cl.
CPC ............ *B64D 11/003* (2013.01); *B33Y 80/00* (2014.12); *G06Q 20/123* (2013.01)

(58) Field of Classification Search
CPC ... B64D 11/003; B64D 11/0015; B33Y 80/00; G06Q 20/123; G07F 9/10; G07F 19/205; B22F 5/10
See application file for complete search history.

(56) References Cited

U.S. PATENT DOCUMENTS

| | | | |
|---|---|---|---|
| 5,547,052 A | 8/1996 | Latshaw | |
| 9,533,763 B1 | 1/2017 | Kelly | |
| 10,516,431 B2 * | 12/2019 | DiLella | ............. H02J 7/0044 |
| 2009/0308706 A1 | 12/2009 | Mao | |
| 2011/0011760 A1 | 1/2011 | Habersetzer | |
| 2012/0160720 A1 | 6/2012 | Mongan | |
| 2014/0268519 A1 * | 9/2014 | Huang | ............. H04B 1/3888 |
| | | | 361/679.01 |
| 2016/0235173 A1 | 8/2016 | Davis et al. | |

OTHER PUBLICATIONS

USPTO International Search Report, Aug. 12, 2021.

\* cited by examiner

*Primary Examiner* — Rick K Chang
(74) *Attorney, Agent, or Firm* — Olympic Patent Works PLLC

(57) ABSTRACT

The current document is directed to an enclosure for electronic equipment that secures the electronic equipment within a storage space, provides ventilation for the electronic equipment, which generates heat during operation, and protects the electronic equipment from mechanical insults while, at the same time, providing access to control features and display features on the front panel of the electronic equipment. The currently disclosed enclosure includes cooling ports that allow for exchange of air between the external environment and the interior of the enclosure. One implementation of the currently disclosed enclosure can be partly disassembled in order to quickly secure the electronic equipment within the enclosure and can then be quickly reassembled for storage.

7 Claims, 17 Drawing Sheets

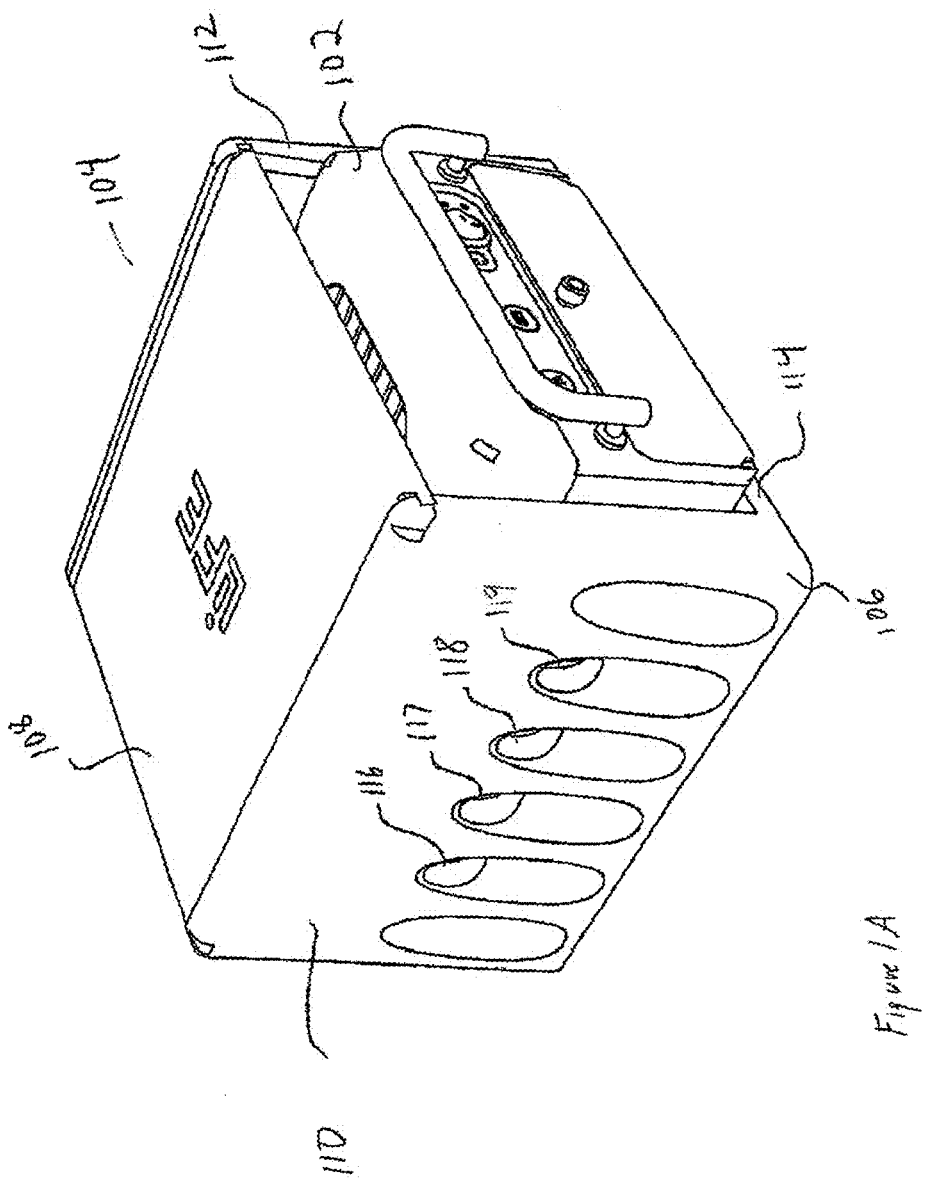

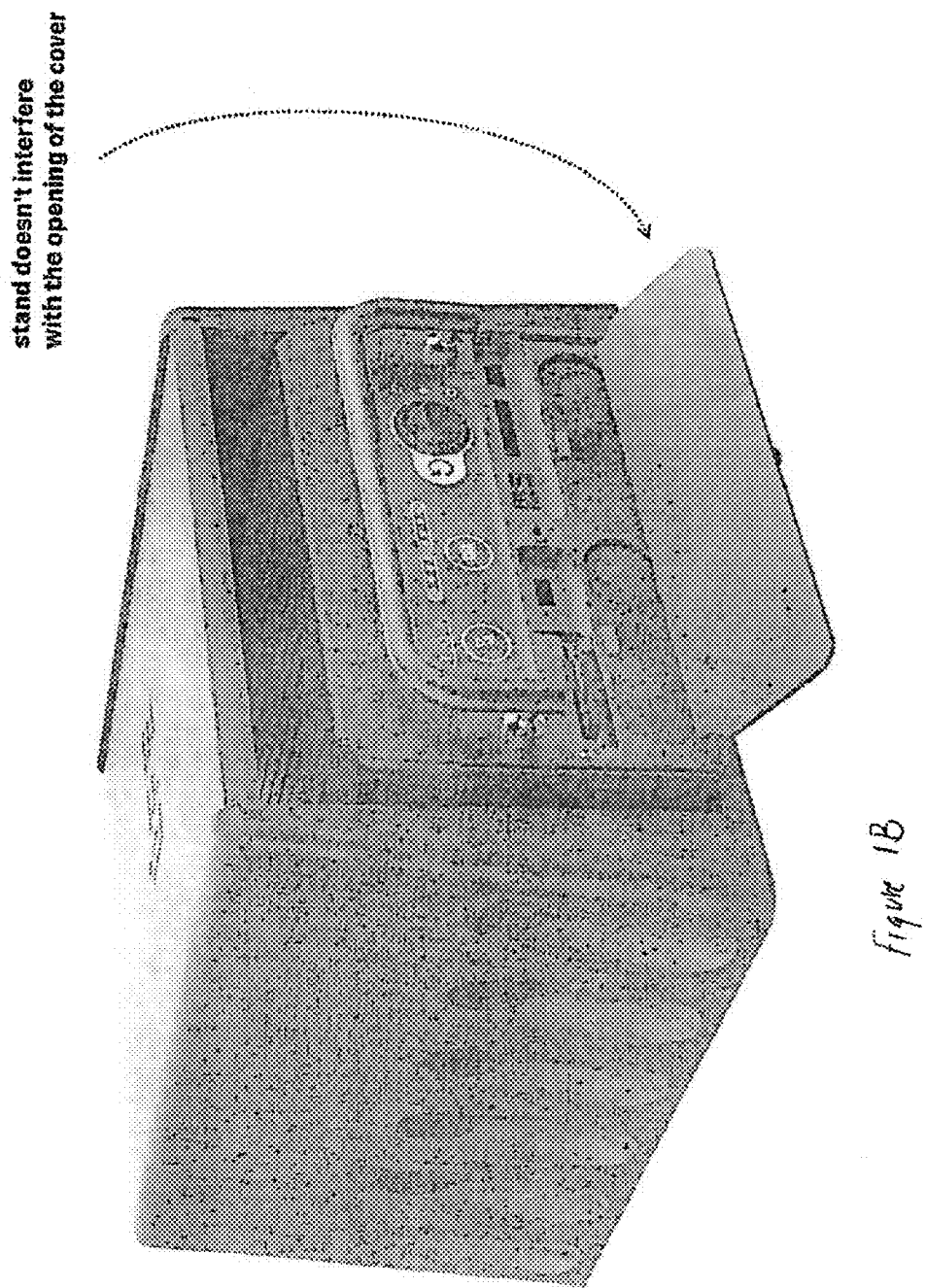

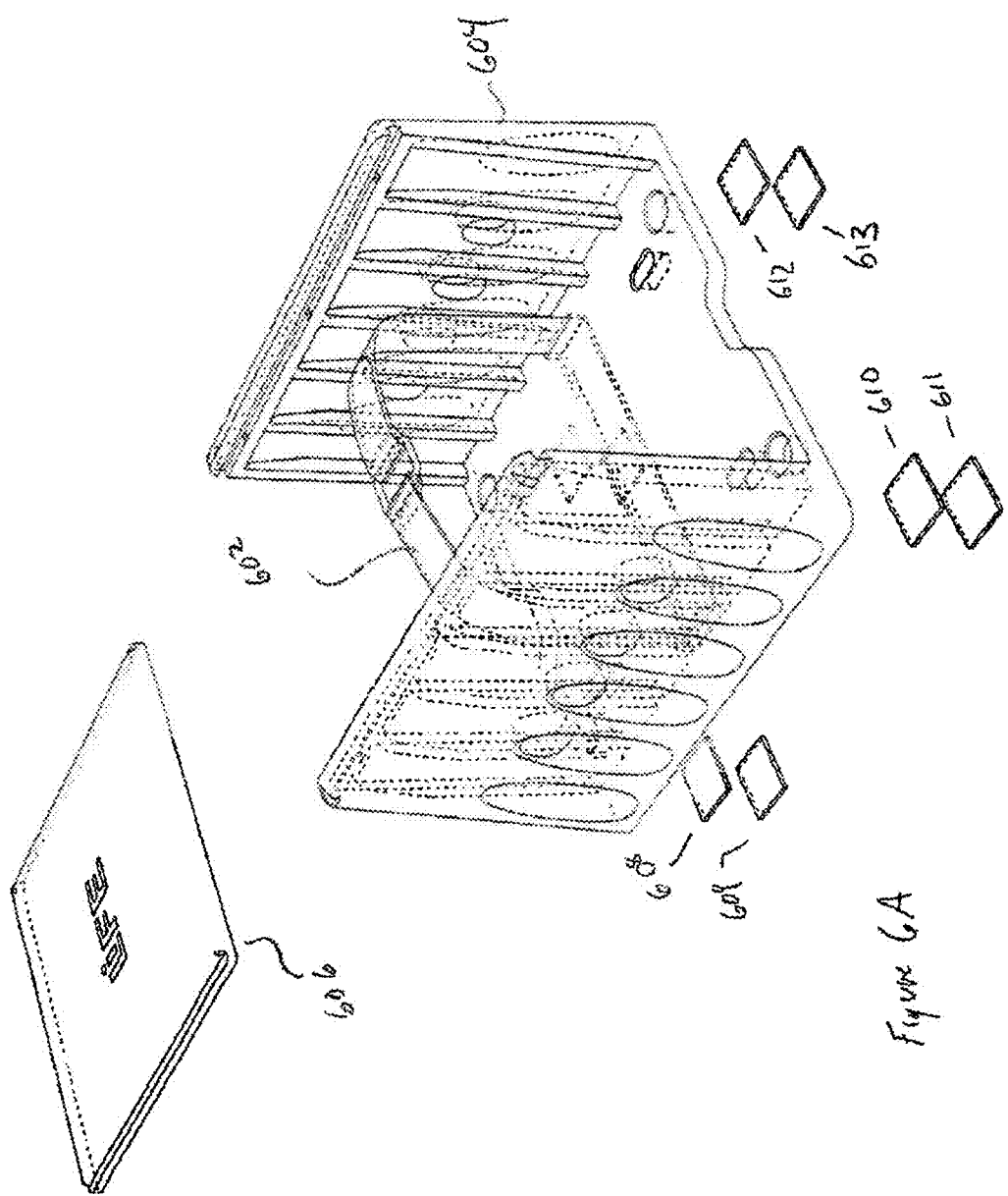

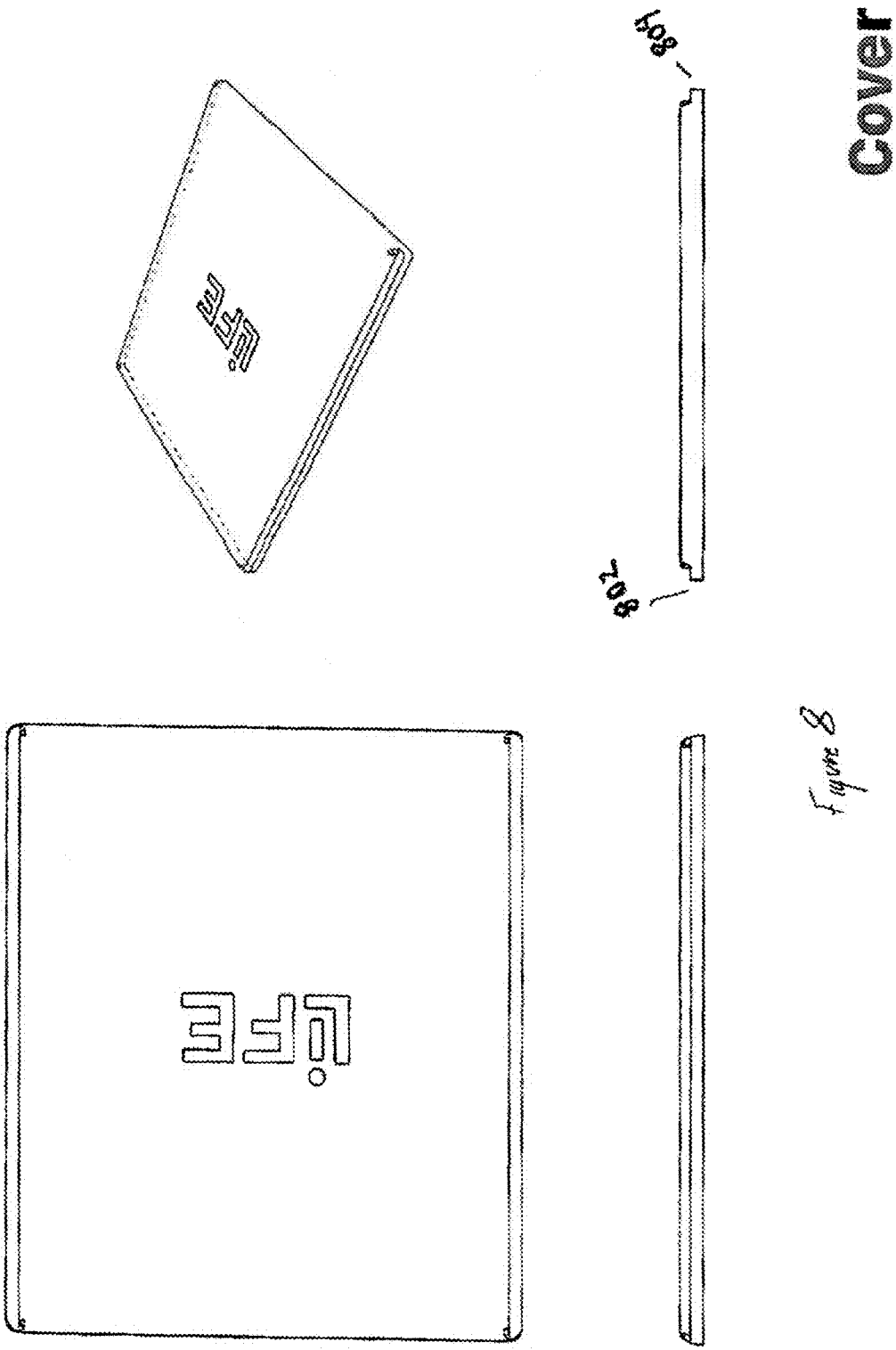

Stand

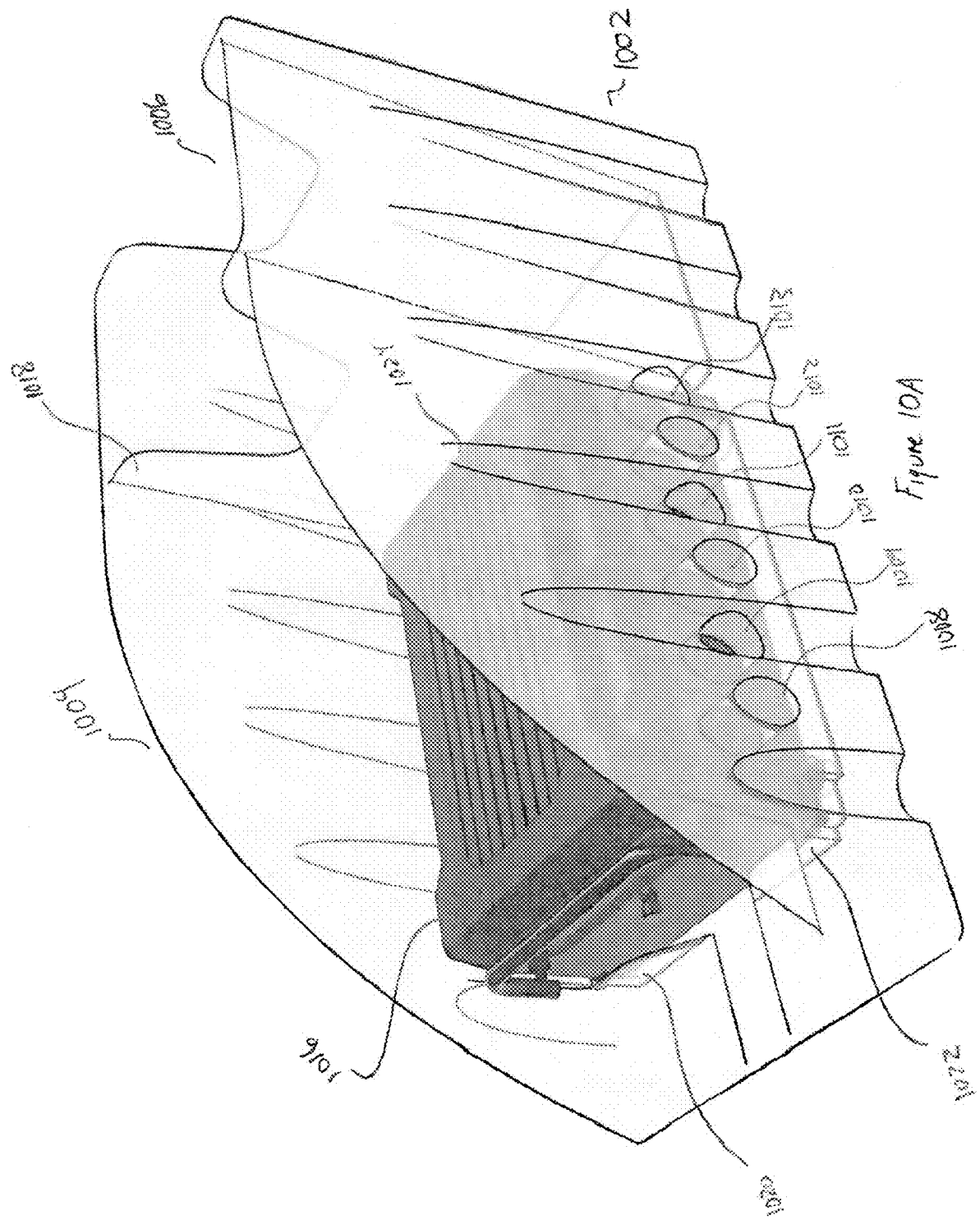

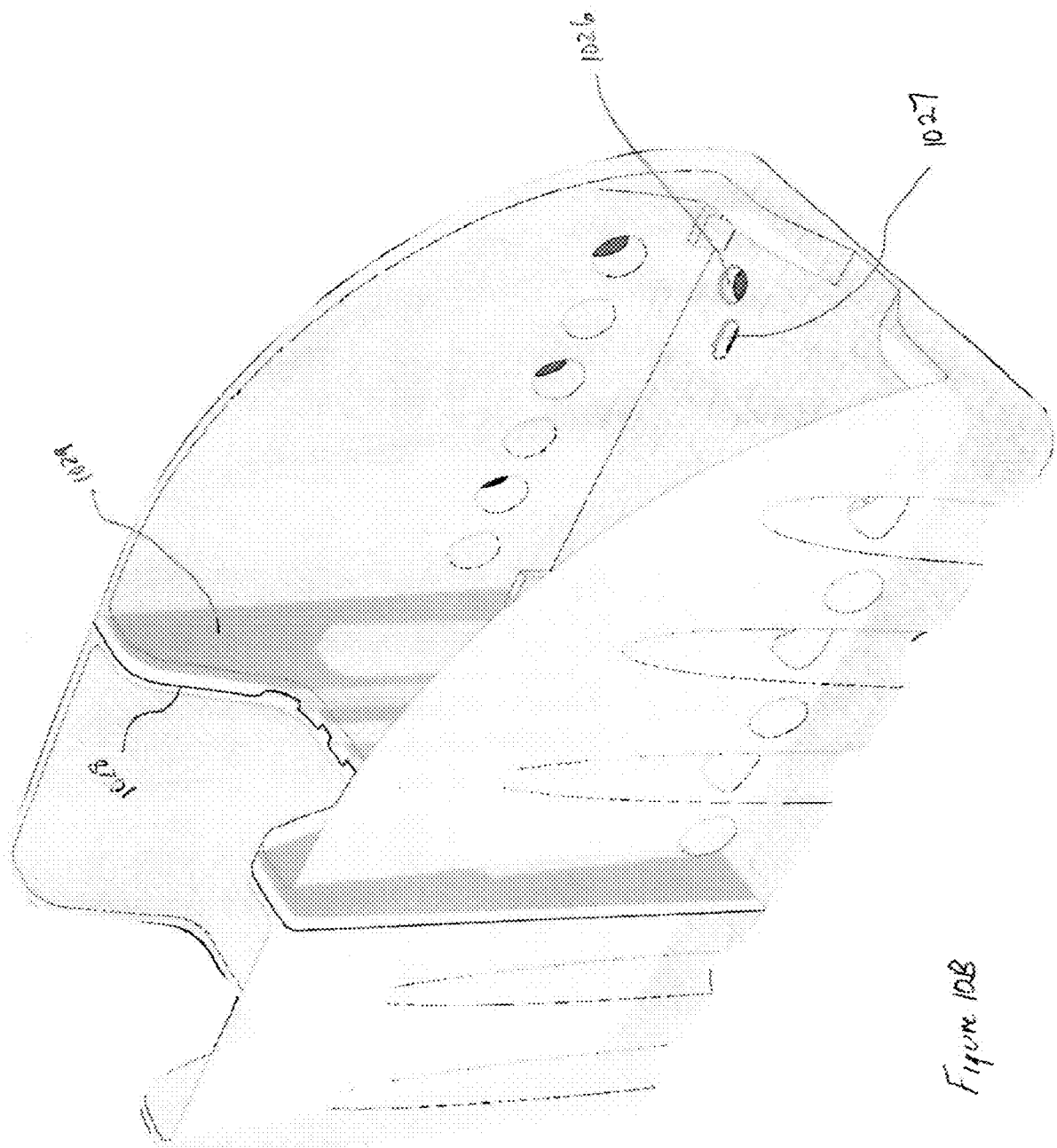

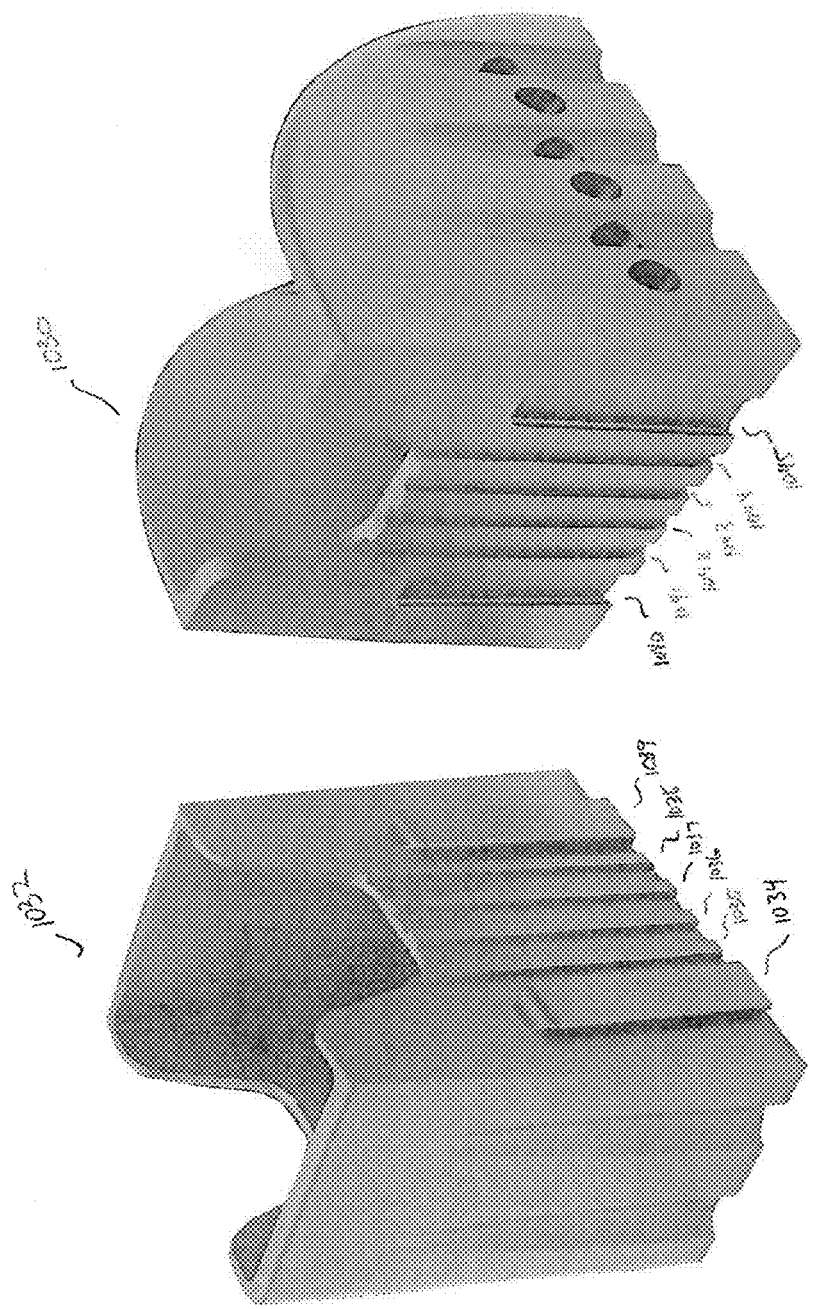

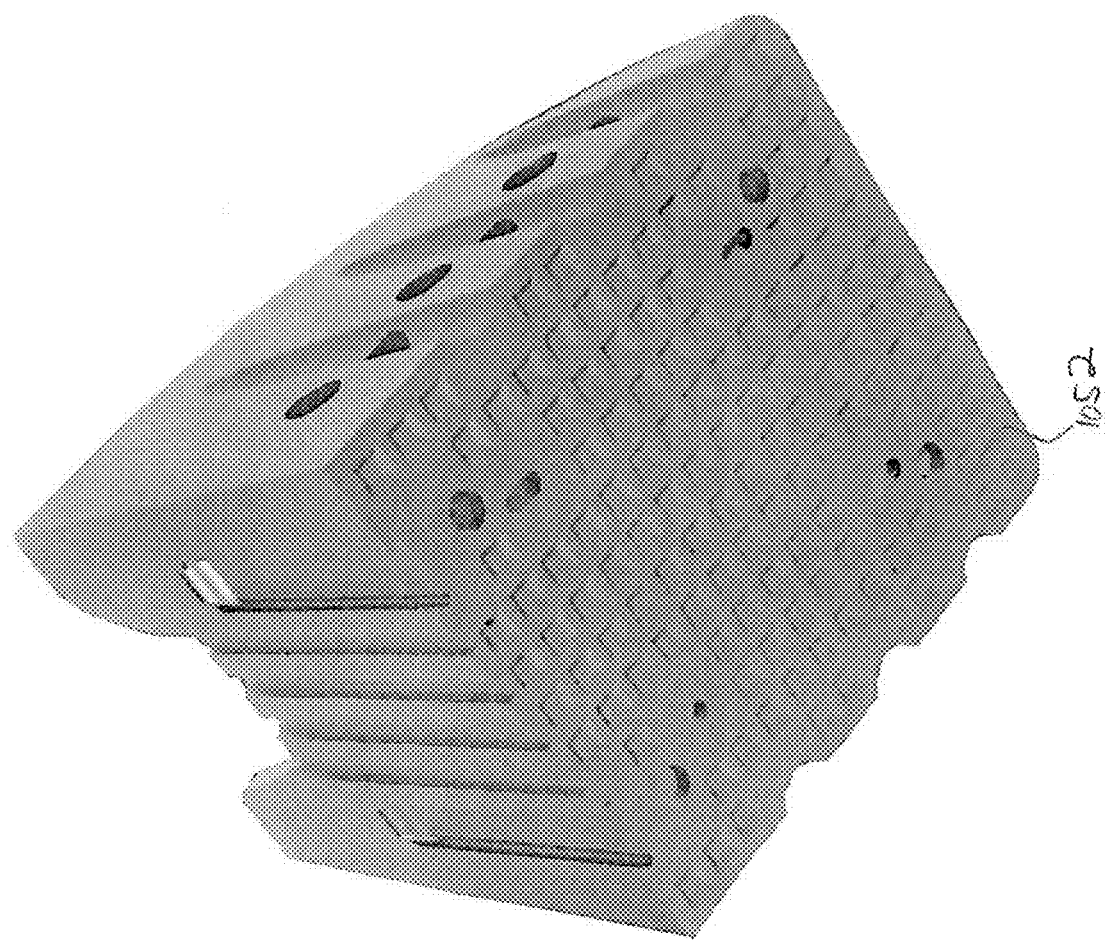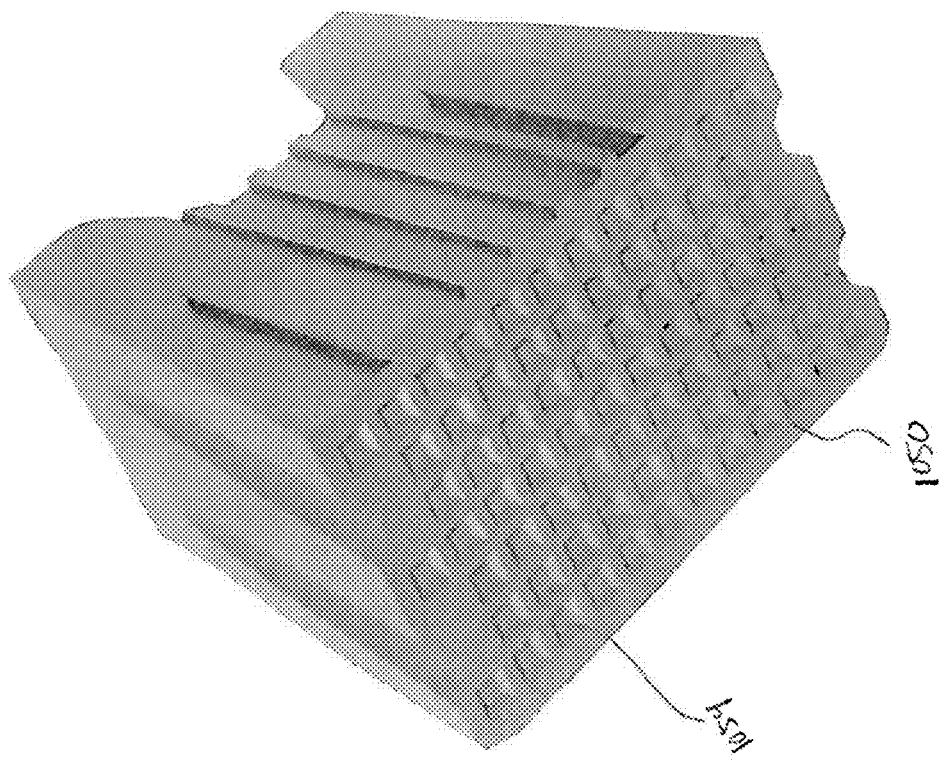
Figure 10D

SECURE ENCLOSURE FOR AN ELECTRONIC INFORMATION, ENTERTAINMENT, AND TRANSACTION SYSTEM

CROSS-REFERENCE TO RELATED APPLICATION

This application claims the benefit of Provisional Application No. 63:000.727, filed Mar. 27, 2020.

TECHNICAL FIELD

The current document is directed to enclosures for protecting electronic equipment and, in particular, to an enclosure designed to protect a battery-powered electronic system used for providing information, entertainment, and transactions to passengers in commercial vehicles, including commercial airliners.

BACKGROUND

Many different types of airline entertainment systems and in-flight transactions for beverages, food, consumer-products, and other in-air and post-travel services. Many years ago, movies were projected for in-in-flight entertainment from a real-to-real movie projectors and most transactions were carried out between airline personnel and passengers. Over the years, many different types of information-and-entertainment systems were developed and deployed in commercial airliners, including audio broadcasts of various information and entertainment channels through headsets and, more recently, electronic displays for displaying movies, television programs, and information. As the capabilities of processor-based electronic systems continue to increase and as the size and costs of such systems continue to decrease, the information, entertainment, and transaction systems can be battery-operated and implemented as relatively small, self-contained devices, similar to modular, rack-mounted computer-system components, so that they can be stored in overhead luggage compartments. However, despite having rigid plastic or metal housings, these devices are easily worn, disfigured, or damaged when passenger luggage is placed into, and taken out of, the same overhead luggage compartments. While the housings are relatively durable, various types of control, input, and display features, including switches, ports, visual indicators, and other such features, are significantly less durable, and can be damaged by mechanical insults and abrasion via contact with various types of personal items stored in, and removed from the overhead compartments. In addition, careless or hurried stowing and removing of passenger items can result in moving a device within the overhead luggage compartment to unfavorable positions and can even result in the device being dropped from the overhead luggage compartment onto passengers, upholstery, or the floor of the passenger compartment. For these reasons, manufacturers and vendors of information, entertainment, and transaction systems and airline operators and personnel have recognized the need for securing and protecting battery-operated, self-contained information, entertainment, and transaction systems.

SUMMARY

The current document is directed to an enclosure for electronic equipment that secures the electronic equipment within a storage space, provides ventilation for the electronic equipment, which generates heat during operation, and protects the electronic equipment from mechanical insults while, at the same time, providing access to control features and display features on the front panel of the electronic equipment. The currently disclosed enclosure includes cooling ports that allow for exchange of air between the external environment and the interior of the enclosure. One implementation of the currently disclosed enclosure can be partly disassembled in order to quickly secure the electronic equipment within the enclosure and can then be quickly reassembled for storage.

BRIEF DESCRIPTION OF THE DRAWINGS

FIG. 1A shows a perspective view of the currently disclosed enclosure in which an electronic information, entertainment, and transaction system ("IET") is mounted.

FIG. 1B provides a photograph of the currently disclosed enclosure and enclosed IET.

FIGS. 6A-E provide line drawings of the currently disclosed enclosure.

FIG. 8 shows line drawings of the cover.

FIGS. 10A-D show a second implementation of the disclosed enclosure.

DETAILED DESCRIPTION

Figure 2:
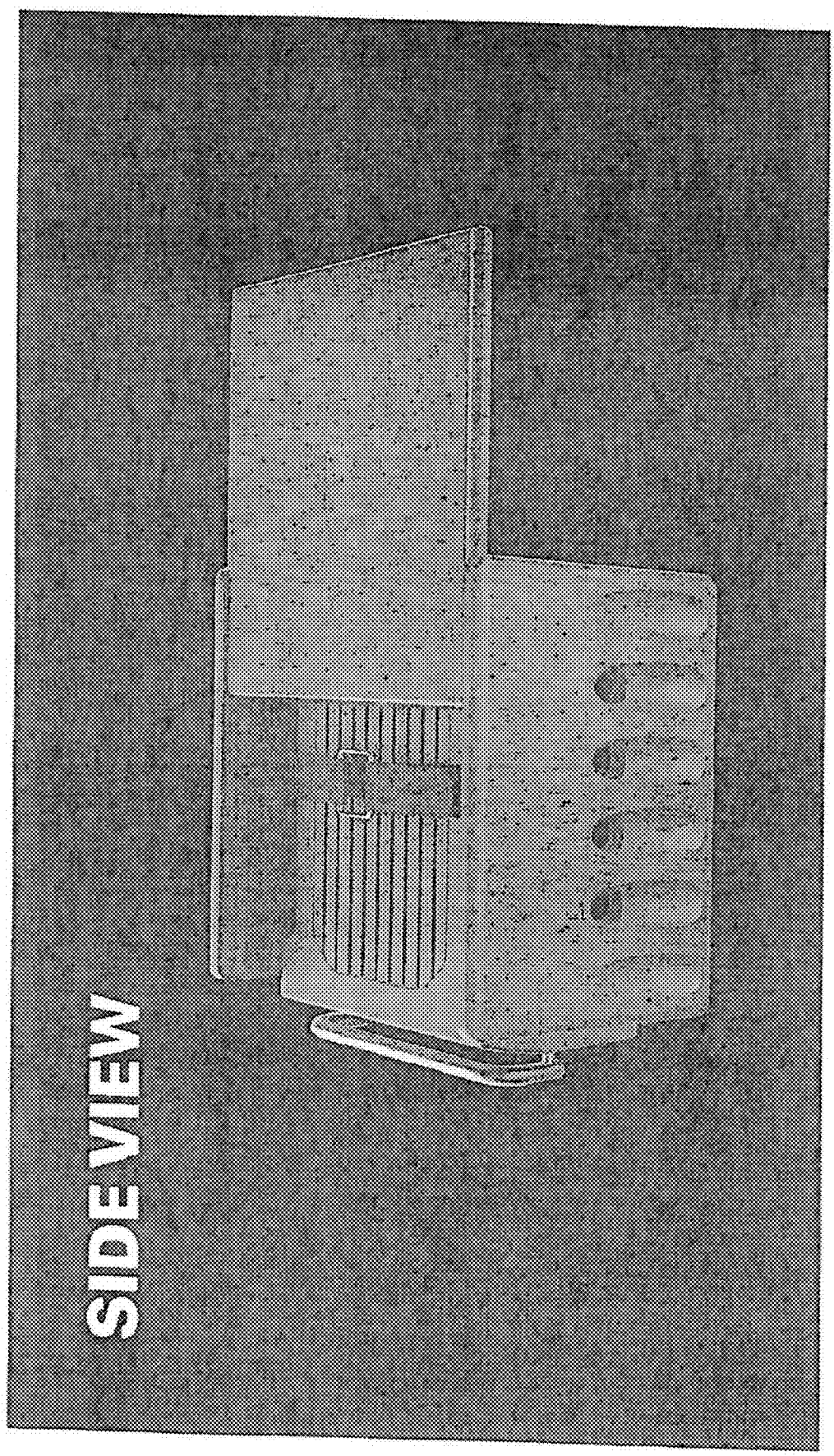
FIG. 2 shows a side view of the currently disclosed enclosure and enclosed IET, with the cover slid back to expose the securing strap.

FIG. 1A shows a perspective view of the currently disclosed enclosure in which an electronic information, entertainment, and transaction system is mounted. The electronic information, entertainment, and transaction system ("IET") 102 is shown enclosed on four sides by the currently disclosed enclosure 104, which includes a stand 106 and a cover 108. The stand is a single-piece component that includes a left wall 110, a right wall 112, and a floor or base 114. The left and right walls contain ports, such as ports 116-119, that allow for exchange of air between the inside of the enclosure and the external environment. Each port includes a relatively small opening through the interior surface of the wall containing the port, with the opening lying at the bottom of a first spinal-shaped well that, in turn, is located within a larger, elliptical well. The ports are designed to maximize heat exchange between the interior of the enclosure and the environment exterior to the enclosure. As discussed below, the currently disclosed enclosure includes a strap for securing the IET within the enclosure, not visible in FIG. 1A, and can be mounted to the cloth or carpet-like interior surface of an airplane overhead baggage compartment or other storage compartment by adhesive hook-and-loop pads mounted to the lower surface of the floor or base of the enclosure. Warm air is forced out of the IET by fans and can then be exchanged with external-environment air through the ports and through the open front and back ends of the enclosure. The electronic device is easily mounted within the enclosure by sliding the device along the upper surface of the floor or base of the stand, securing the electronic device within the stand by tightening the strap around the device, and by then sliding the cover rails along tracks toward the top of the inner sidewalls of the stand. FIG. 1B provides a photograph of the currently disclosed enclosure and enclosed IET.

Figure 3:
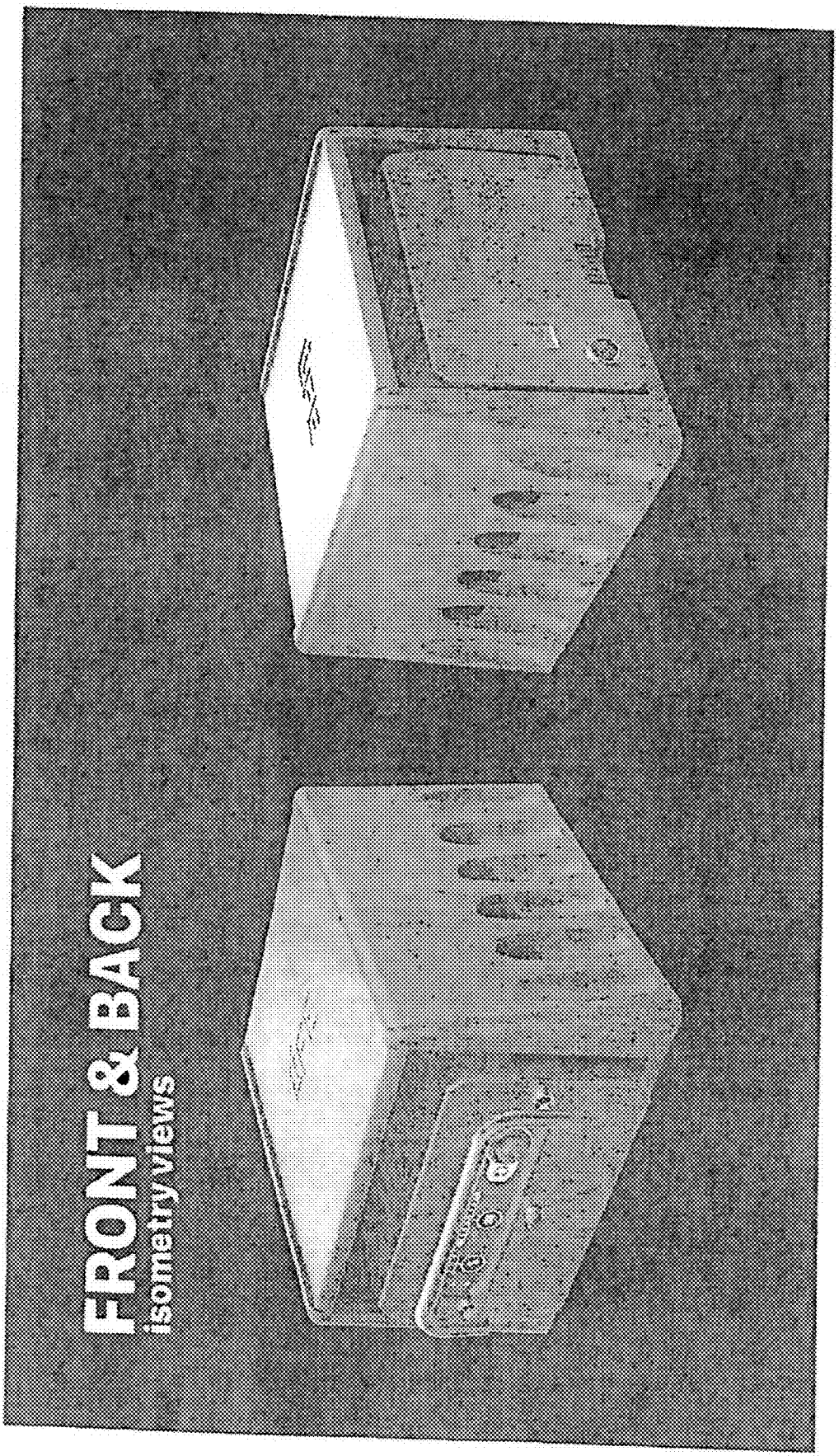
FIG. 3 shows front and rear perspective views of the currently disclosed enclosure within which an IET is mounted.
Figure 4:
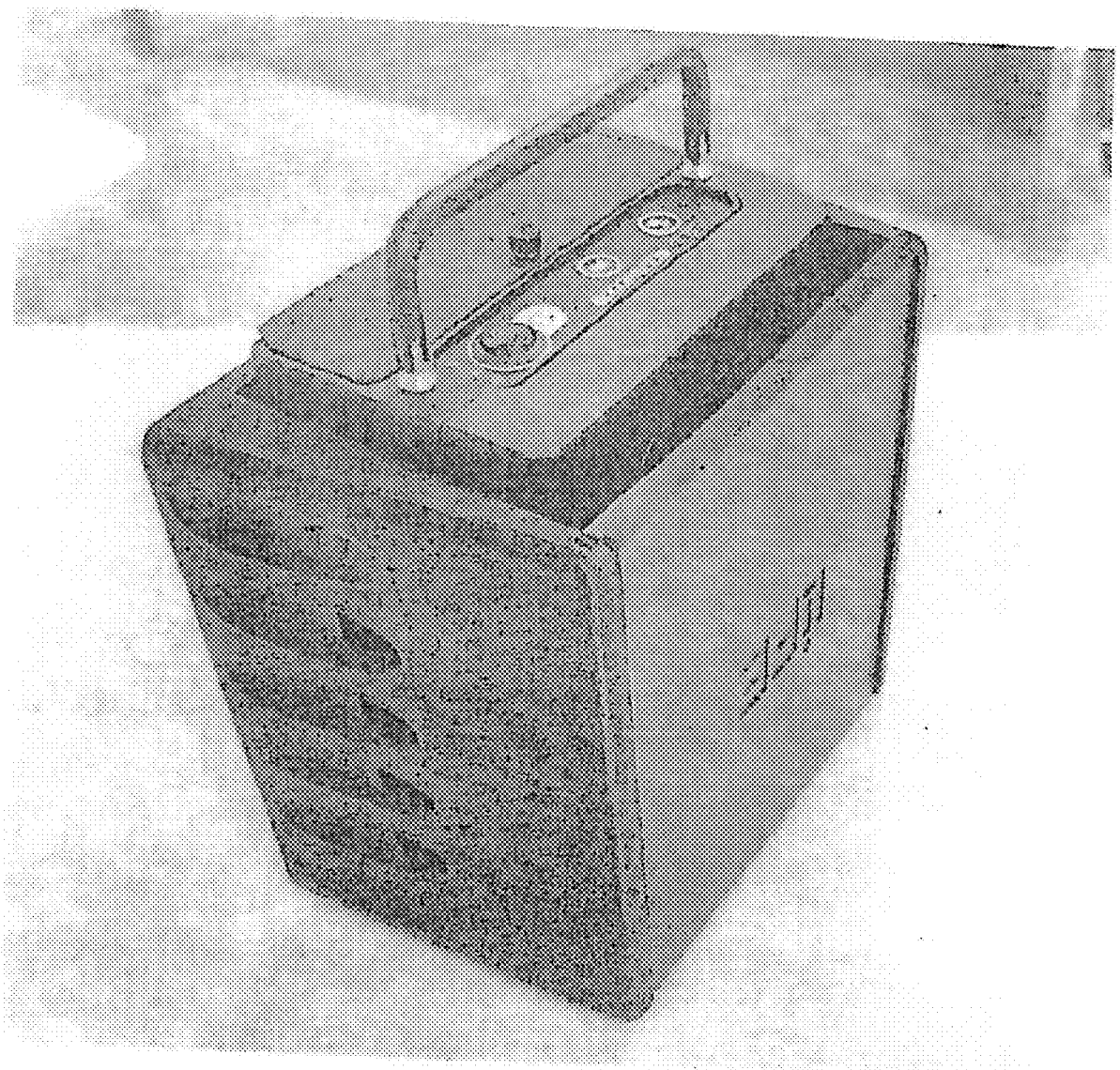
FIG. 4 shows the currently disclosed enclosure resting in a vertical position, with the rear open and downward and enclosed IET secured within by the strap.
Figure 5:
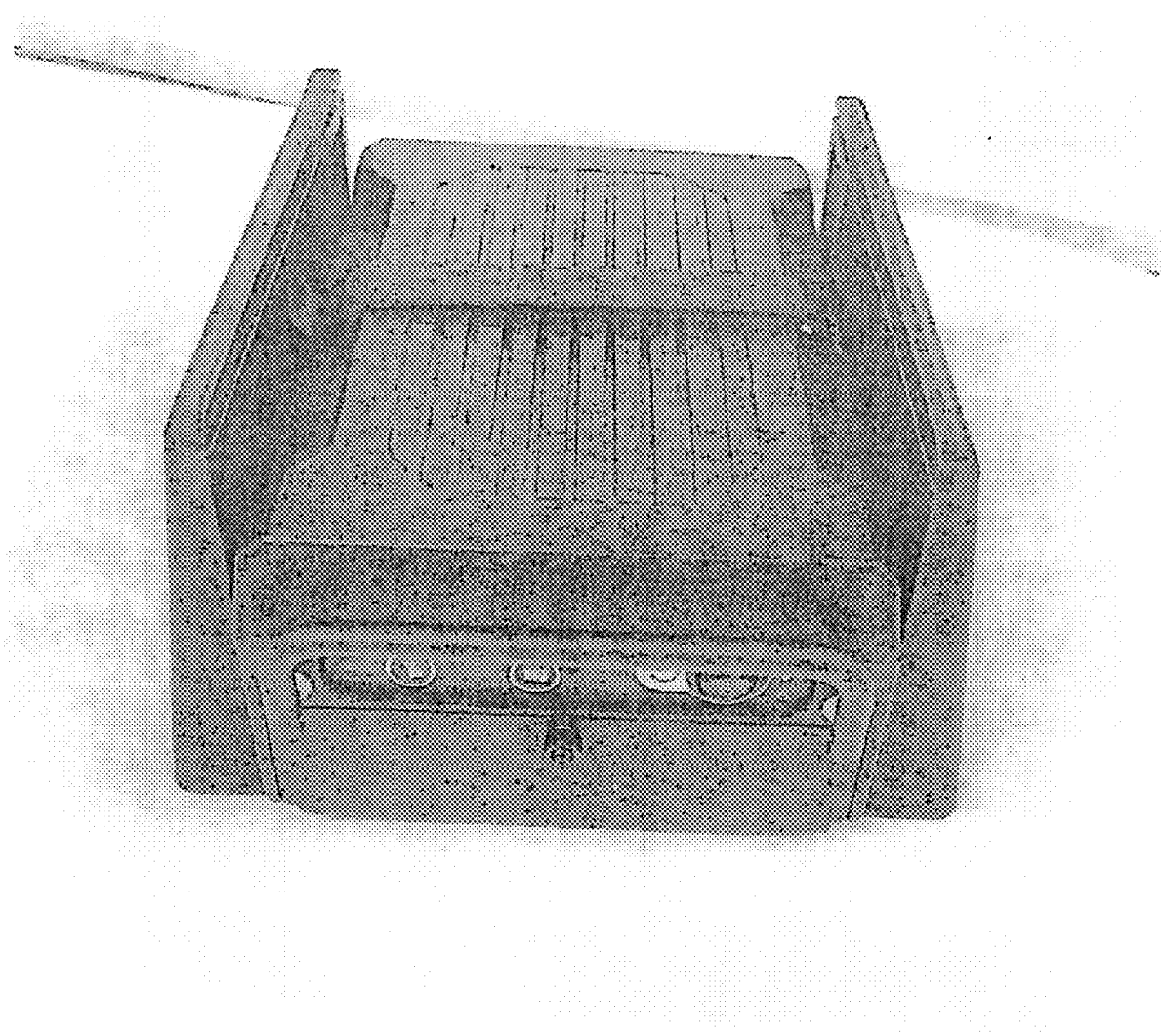
FIG. 5 shows the currently disclosed enclosure from the front with the cover removed.

FIG. 2 shows a side view of the currently disclosed enclosure and enclosed IET, with the cover slid back to expose the securing strap. FIG. 3 shows front and rear perspective views of the currently disclosed enclosure within which an IET is mounted. FIG. 4 shows the currently disclosed enclosure resting in a vertical position, with the rear open and downward and the enclosed IET secured within by the strap. FIG. 5 shows the currently disclosed enclosure from the front with the cover removed.

Figure 6D:
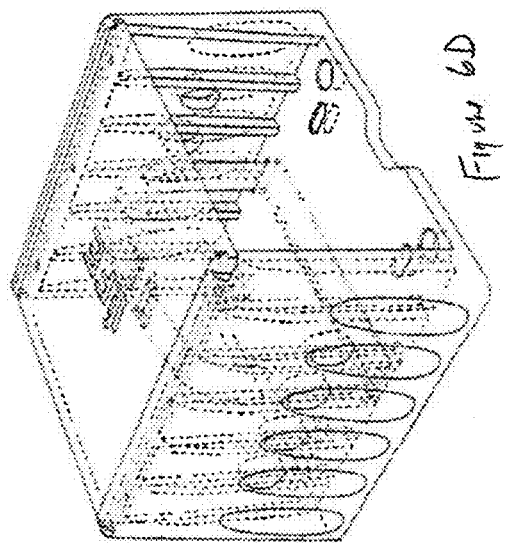
Figure 6E:
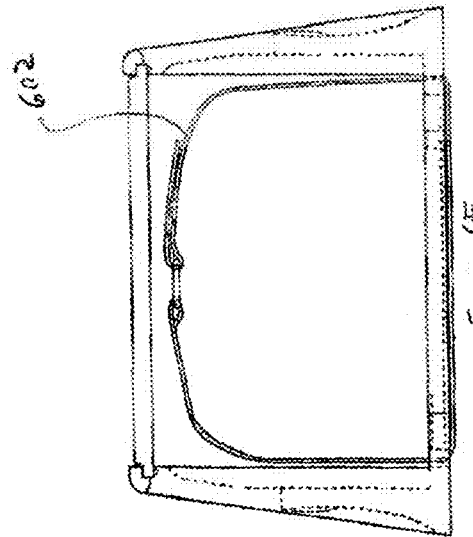
Figure 6B:
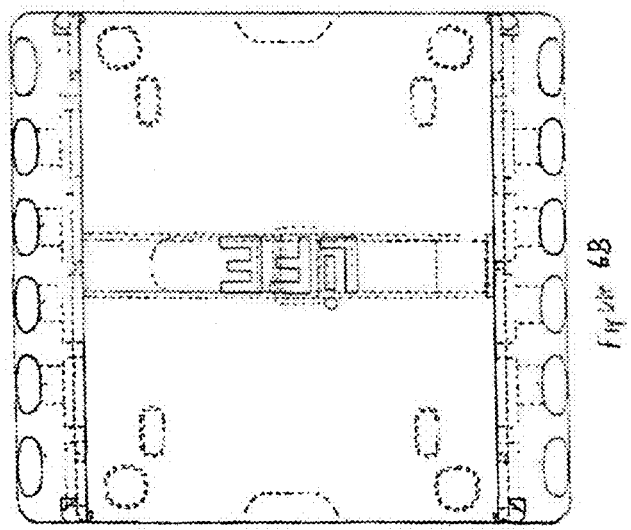
Figure 6C:
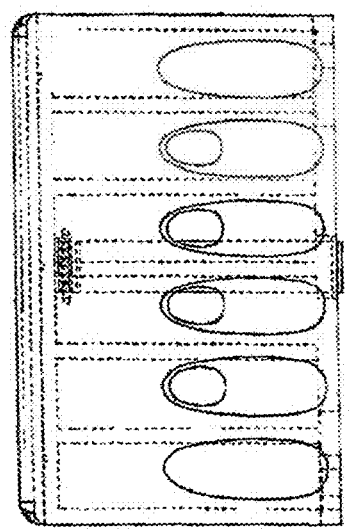

FIGS. 6A-E provide line drawings of the currently disclosed enclosure. FIG. 6A shows the strap 602 mounted within the stand 604, with the cover 606 and hook-and-loop pads 608-613 shown detached from the stand. FIG. 6B is a perspective view of the stand from the top. FIG. 6C is a side view of the stand with attached cover. FIG. 6D shows a perspective view of the fully assembled enclosure, and FIG. 6E illustrates the enclosure viewed from one end with the strap 602 passing through the base or floor of the stand at either side in order to secure the strap to the stand.

Figure 7:
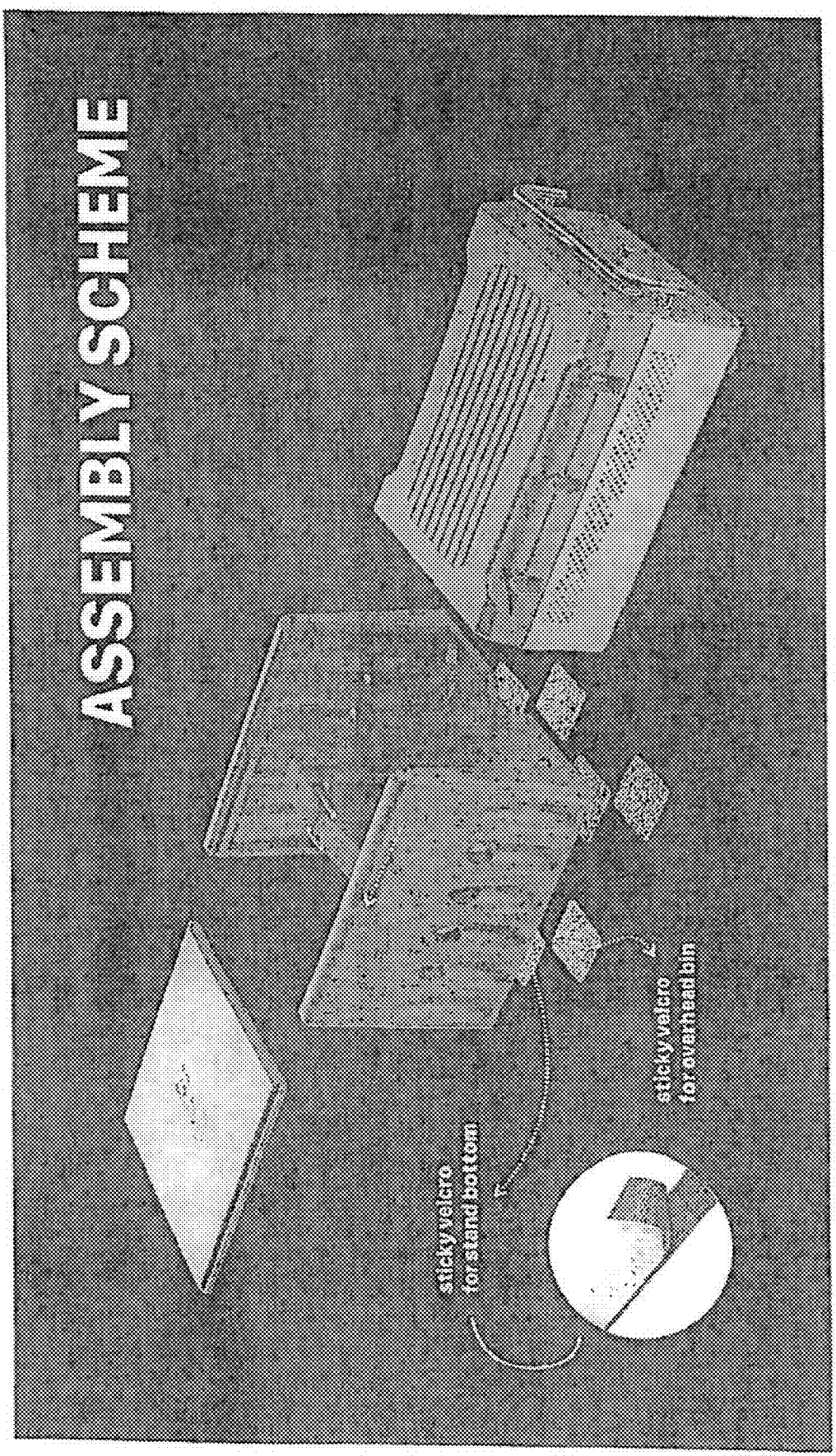
FIG. 7 provides a solid-model representation of the stand components along with an IET.
Figure 9C:
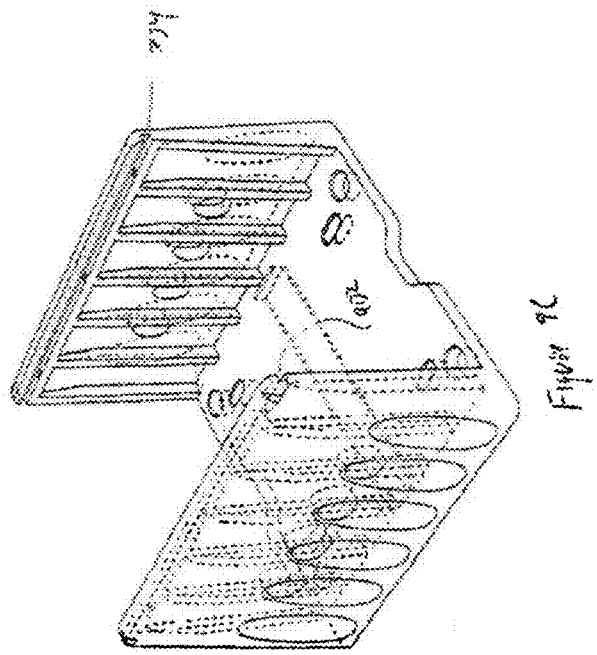
FIGS. 9A-D show additional line drawings of the stand.
Figure 9D:
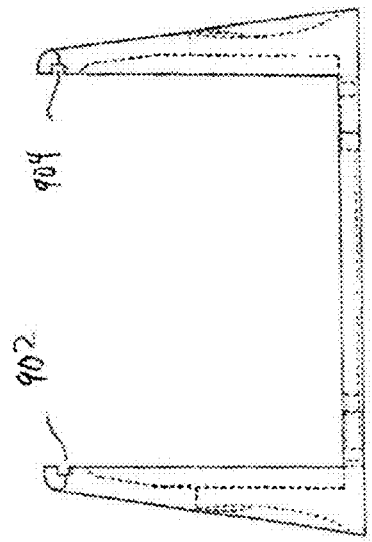
Figure 9A:
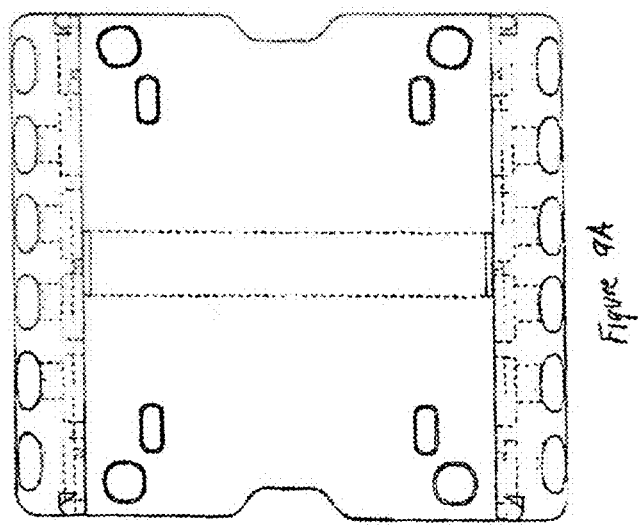
Figure 9B:
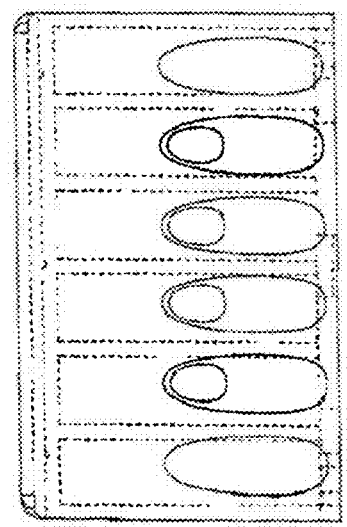

FIG. 7 provides a solid-model representation of the stand components along with an IET. FIG. 8 shows line drawings of the cover. FIGS. 9A-D show additional line drawings of the stand. The tracks for the top of the inner surfaces of the sidewalls 902 and 904 are readily seen in FIGS. 9C-D. The complementary rails of the cover 802 and 804 are readily observed in FIG. 8.

The stand component of the currently disclosed enclosure, in one implementation, is printed in a 3D printer in order to produce the complex curves of the side-wall ports, internal rib-like features of the sidewalls, and other detailed features and surfaces of the stand. The enclosure can be manufactured from a variety of different materials, including plastics, composite materials, metallic materials, and other strong, rigid materials that provide adequate protection for the enclosed IET but that are also lightweight and have durable surface finishes.

FIGS. 10A-D show a second implementation of the disclosed enclosure. FIG. 10A shows an IET mounted within the second implementation of the disclosed enclosure. The second implementation of the disclosed enclosure 1002 is illustrated as transparent, in FIG. 10A, to clearly show the placement of the IET within the enclosure. The sidewalls 1004 and 1006 of the second implementation of the enclosure are relatively taller than the corresponding sidewalls of the first implementation of the enclosure, discussed above, and are curved to conform to the shape of the interior of the overhead baggage compartments used by many airlines. As with the first implementation, the second implementation of the enclosure features ports 1008-1013 in each sidewall to facilitate heat exchange between the immediate environment of the IET within the enclosure and the external environment. The second implementation of the enclosure comprises two 3D-printed components that slidably mount to one another, as discussed further, below. The IET 1016 is mounted within the first component, which shares a vertical wall or partition 1018 with the second component. Small corner fences 1020 and 1022 securely hold the IET in place while allowing access to the forward surface of the IET. Vertical, elliptical wells, such as vertical, elliptical well 1024, promote heat exchange.

FIG. 10B provides an alternative view of the second implementation of the disclosed enclosure without the IET. In this view, four holes in the base, including hole 1026, are visible. These holes accommodate circular pads, or feet, extending from the bottom surface of the IET. Four additional elliptical holes are also present in the base, including elliptical hole 1027. The elliptical holes may accommodate additional features of the IET. In this view, dark curved line 1028 indicates the boundary between the two components of the second implementation of the enclosure. The vertical, interior wall 1029 is composed of vertical walls of the two components that slide together and that are held together by mating features, discussed below.

FIG. 10C shows solid-model representations of the two components of the second implementation of the disclosed enclosure separated from one another. The first component 1030 can be lifted above the surface on which the second component 1032 is standing and then lowered in order to engage vertical male features 1034-1039 of the second component with corresponding female features 1040-1045 of the first component.

FIG. 10D shows the solid-model representations of the two components of the second implementation of the disclosed enclosure, shown in FIG. 10C, from a different perspective. In this perspective, the bottom exterior surfaces 1050 and 1052 of the two components are visible. The bottom surfaces include a grid-like arrangement of rectangular depressions, such as rectangular depression 1054. These depressions, along with the tall, vertical, elliptical wells in the sidewalls decrease the mass of the enclosure while forming rib-like structures that increase the rigidity of the enclosure.

Figure 11B:
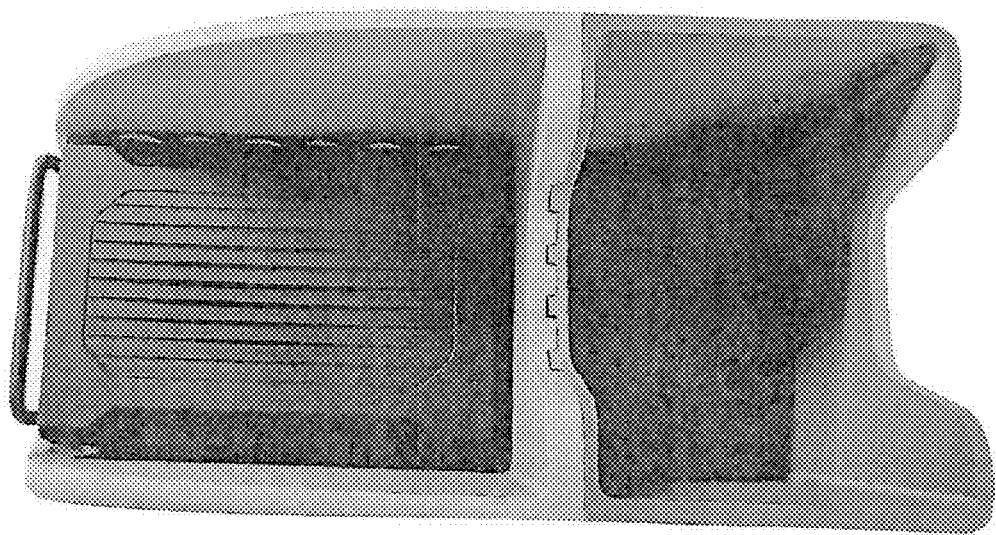
FIGS. 11A-C show additional views of the second implementation.
Figure 11A:
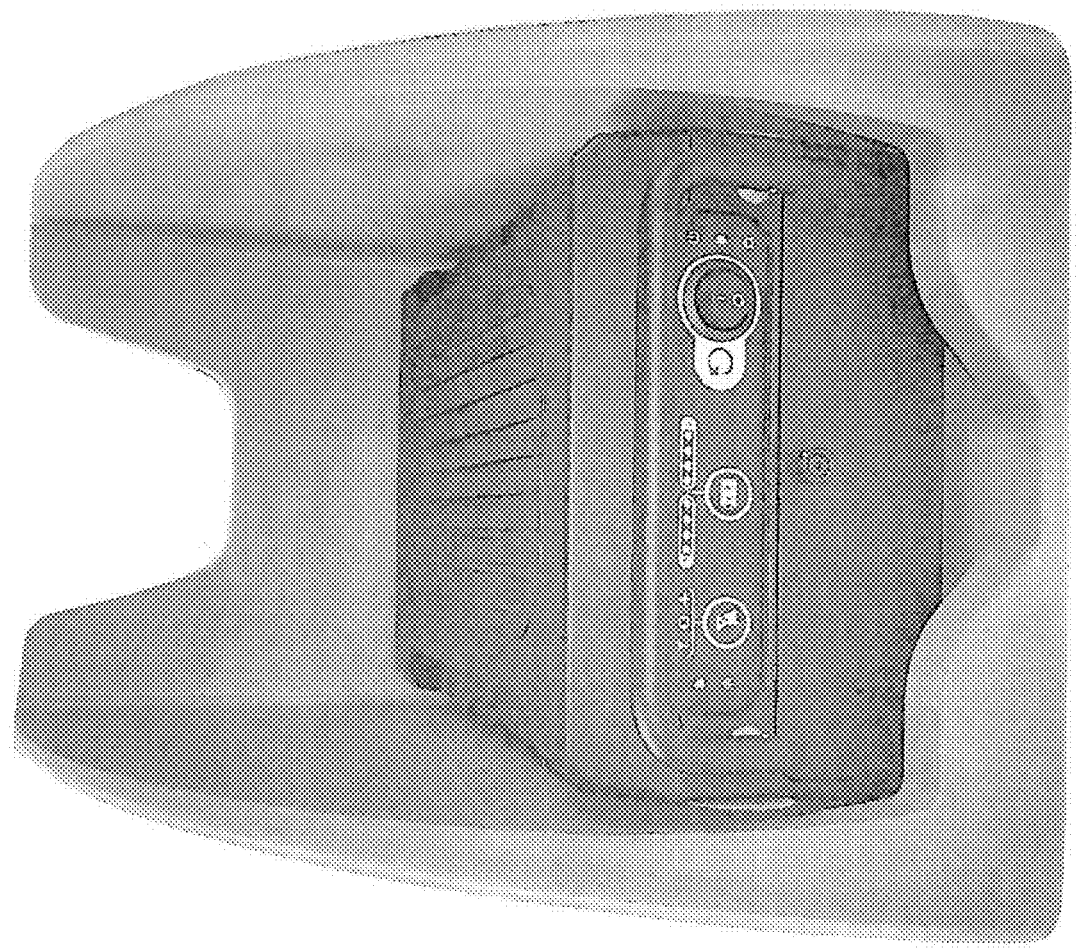
Figure 11C:

FIGS. 11A-C show additional views of the second implementation. FIG. 11A shows the IET securely mounted within the second implementation of the enclosure, with the front panel of the IET clearly accessible to users. FIG. 11B shows the IET securely mounted within the second implementation of the enclosure from above. FIG. 11A shows the IET securely mounted within the second implementation of the enclosure from a slightly different perspective than that of FIG. 11A.

Although the present invention has been described in terms of particular embodiments, it is not intended that the invention be limited to these embodiments. Modifications within the spirit of the invention will be apparent to those skilled in the art. For example, the currently disclosed enclosure can be used to enclose a variety of different types of mechanical, electromechanical, electronic, optical, and other systems.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. An enclosure that secures and protects an electronic device, the enclosure comprising:
   an interior;

a rigid stand having two approximately vertical side walls with rounded top exterior edges and an enclosure base;

a series of two or more air-exchange ports within each of the two vertical side walls, each particular air-exchange port providing air exchange between the interior of the enclosure and an environment external to the enclosure and comprising a first opening in an interior surface of the side wall including the particular air-exchange port, a second opening in an exterior surface of the side wall including the particular air-exchange port, and a channel providing fluid communication between the interior of the enclosure and the environment external to the enclosure;

a series of two or more vertically oriented, parallel depressions in the exterior surface of each of the two side walls that each surrounds one of the second openings in the exterior surface of the side wall that includes the vertically oriented, parallel depression, each series of two or more vertically oriented, parallel depressions forming vertical rib-like structures between adjacent vertically oriented, parallel depressions;

at least one vertical end of the rigid stand open to provide access to the electronic device and air exchange between the interior of the enclosure and the environment external to the enclosure;

holes in the enclosure base that accommodate complementary features extending downward from an external lower surface of the electronic device; and adhesive hook-and-loop pads mounted to a lower exterior surface of the enclosure base to secure the enclosure to a floor of an overhead baggage compartment in an airliner;

wherein the enclosure has dimensions and a shape that allow the enclosure to be secured within the overhead baggage compartment and that allow the enclosure to securely contain the electronic device.

2. The enclosure of claim 1 further comprising
   a strap mounted within the rigid stand that secures the electronic device to the stand; and
   a cover that slides along tracks on inner surfaces of the side walls to enclose the electronic device from above.

3. The enclosure of claim 1 wherein the rigid stand further comprises a first component and a second component that are mounted to one another via mounting features.

4. The enclosure of claim 3 wherein the rigid stand further includes an interior, vertical wall, parallel to a back wall of the second component, that forms a back vertical wall of the first component and a front vertical wall of the second component.

5. The enclosure of claim 4 wherein the forward surface of the front vertical wall of the second component includes multiple, vertically oriented male mating components complementary to multiple, vertically oriented female mating components on the rear surface of the back vertical wall of the first component.

6. The enclosure of claim 5 wherein sliding of the rear surface of the back vertical wall of the first component relative to the front vertical wall of the second component engages the mating components to produce the interior, vertical wall, parallel to the back wall, of the rigid stand.

7. The enclosure of claim 4 wherein the side walls of the first component curve downwards from the back vertical wall to the front of the base.

* * * * *